United States Patent
Forseth

[11] 3,972,986
[45] Aug. 3, 1976

[54] PRODUCTION OF HIGH STRUCTURE SOFT CARBON BLACK

[75] Inventor: Glenn J. Forseth, Toledo, Ohio

[73] Assignee: Phillips Petroleum Company, Bartlesville, Okla.

[22] Filed: June 4, 1973

[21] Appl. No.: 366,526

[52] U.S. Cl. .............................. 423/456; 423/450; 423/455
[51] Int. Cl.² ...................... C09C 1/50; C01B 31/02
[58] Field of Search ........... 423/449, 450, 455, 456, 423/457

[56] References Cited
UNITED STATES PATENTS

| | | | |
|---|---|---|---|
| 2,375,797 | 5/1945 | Krejci | 423/456 |
| 2,419,565 | 4/1947 | Krejci | 423/457 |
| 2,587,107 | 2/1952 | Cade | 423/450 |
| 3,175,888 | 3/1965 | Krejci | 423/450 |
| 3,333,928 | 8/1967 | Kobayashi | 423/456 |
| 3,375,075 | 3/1968 | Ruble | 423/455 |
| 3,486,853 | 12/1969 | Henderson et al. | 423/456 |
| 3,490,869 | 1/1970 | Heller | 423/455 |
| 3,642,446 | 2/1972 | Heller et al. | 423/455 |
| 3,701,827 | 10/1972 | Dahmen | 423/456 |
| 3,726,964 | 4/1973 | Krejci | 423/450 |
| 3,748,100 | 7/1973 | Forseth | 423/450 |

FOREIGN PATENTS OR APPLICATIONS

| | | | |
|---|---|---|---|
| 461,497 | 2/1937 | United Kingdom | 423/450 |

Primary Examiner—Oscar R. Vertiz
Assistant Examiner—Gary P. Straub

[57] ABSTRACT

A method of producing carbon black wherein a reaction mixture consisting essentially of hydrocarbon feed and gases introduced into a first zone are passed into a second zone having a diameter greater than the diameter of the first zone at a temperature proximate the pyrolytic decomposition temperature of the hydrocarbon feed.

2 Claims, 1 Drawing Figure

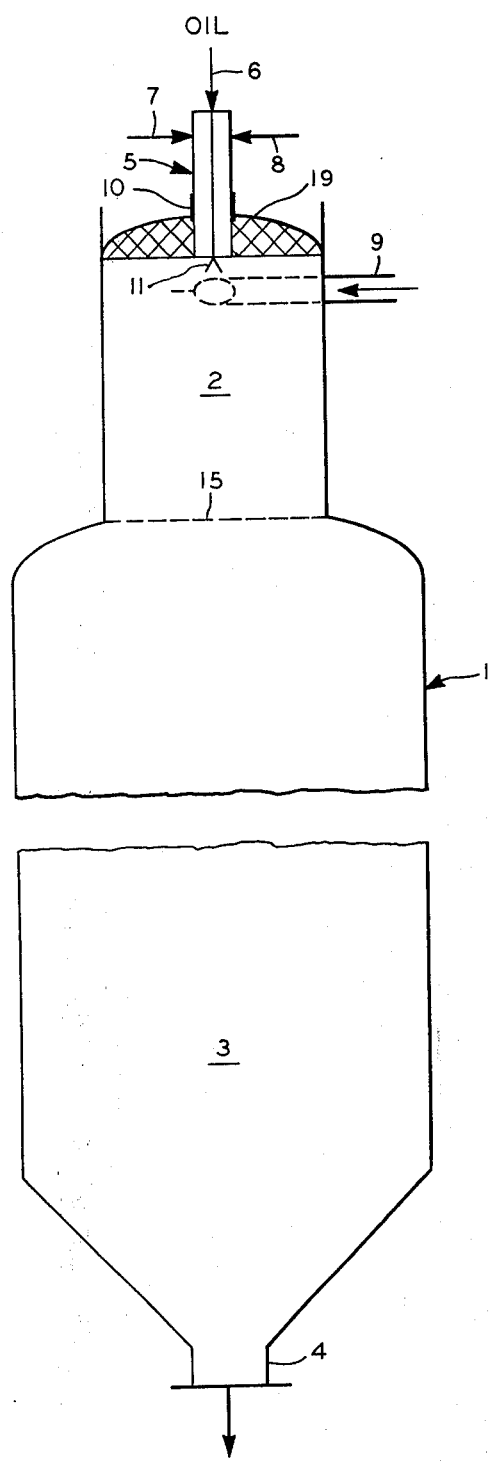

PRODUCTION OF HIGH STRUCTURE SOFT CARBON BLACK

This invention relates to the production of very high structure, soft (GPF — General Purpose Furnace) carbon black.

In one of its more specific aspects, this invention relates to the production of a carbon black having a dibutylphthalate structure of about 160 and a nitrogen surface area of about 35 square meters per gram.

In application Ser. No. 137,438, now U.S. Pat. No. 3,748,100, there is disclosed a carbon black reactor adapted to operate in a vertical position, the reactor being comprised of an upper section of a first diameter and of a lower section, contiguous with the upper section, and having a greater diameter of that of the upper section.

That patent, the disclosure of which is incorporated herein by reference, provides a means for altering the length of the upper section and discloses that various types of carbon black can be produced therein depending upon the length of the upper section.

It has now been determined that the aforementioned reactor can be employed to produce a high structure, soft black. The present invention involves that method.

According to the present invention there is provided a method of producing carbon black by the pyrolytic decomposition of a hydrocarbon feed which involves introducing a hydrocarbon feed, a fuel and a free oxygen-containing gas, hereinafter referred to as air, into a first zone of a carbon black reactor. The fuel is oxidized with the air to produce hot combustion gases which are brought into contact with the hydrocarbon feed for a period sufficient to bring the hydrocarbon feed to its pyrolytic decomposition temperature.

Immediately upon attainment of its pyrolytic decomposition temperature by the hydrocarbon feed, the hydrocarbon feed and hot combustion gases are introduced into a carbon black formation section having a cross-sectional area greater than the area of the first zone. The hydrocarbon feed and hot combustion gases are conducted through the second section under carbon black forming conditions to produce carbon black which is recovered.

The reactor of the aforementioned patent is particularly suitable for employment in the method of this invention inasmuch as the reactor is adapted for altering the length of its first zone. Accordingly, the length of the first zone can be adjusted so that the feed reaches its pyrolytic decomposition temperature just as it is introduced into the second, larger-diameter zone.

The method of the present invention requires that the hydrocarbon feed be brought to its pyrolytic decomposition temperature in the presence of the hot combustion gases and be thoroughly mixed with the hot combustion gases prior to the introduction into the second zone. Therefore, the method of the present invention will most frequently involve a preheating of the hydrocarbon feed.

The mixture formed in the first zone consists essentially of hydrocarbon feed and hot combustion gases produced by the oxidation of a fuel with a free oxygen-containing gas. It is this mixture, consisting essentially of these components, in the absence of the further introduction of additional components thereinto, that is passed through the first and second zones to produce carbon black.

The method of the present invention will be more easily understood if explained in conjunction with the attached drawing which illustrates one embodiment of the reactor suitable for the practice of the invention.

Referring to the attached drawing there is shown reactor 1 formed of an upper section 2 and a lower section 3.

Lower section 3 is adapted with conduit outlet means 4 through which carbon black can be removed from the reactor.

Upper section 2 is adapted with axial manifold 5 having conduits 6, 7 and 8 through which hydrocarbon feed, air and a gaseous fuel can be introduced. It is also adapted with conduit means 9 which can open into section 2 either radially or tangentially through the circumferential periphery of the zone for the introduction of fuel and air, or hot combustion gases thereinto. The section is also adapted with movable head 19 which can be raised or lowered to imaginary line 15 to alter the length of section 2, the head being movable by means not shown. Manifold 5 can penetrate head 19 through slip-joint 10 so as to adjust the locus of discharge of nozzle 11.

In the practice of this invention, hydrocarbon feed is introduced through conduit 6 and air and a gaseous fuel, if employed, are introduced through conduits 7 and 8. Fuel and air or hot combustion gases are introduced into section 2 through conduits 9 and into contact with the hydrocarbon feed to form a reactant mass.

The reactant mass is conducted through section 2 while mixing occurs and the feed is being brought to its decomposition temperature. This has been accomplished by the time the reactant mass reaches imaginary line 15. At this point, the reactant mass, with the hydrocarbon feed at the threshold of its pyrolytic decomposition temperature, is expanded by being introduced into section 3.

The velocity of the reactant mass in section 3 is considerably less than that in section 2. The reactant mass is conducted through section 3 at a reduced velocity while the feed is converted to carbon black. The black is recovered as smoke through conduit 4.

In the preferred embodiment of this invention, the method is carried out employing an air to fuel volume ratio of about 16 to 1 and a total air to oil ratio of about 340 to about 360 SCF per gallon and, preferably, about 355 SCF per gallon. No materials are introduced into the reactant mass after it has reached a temperature equal to the decomposition temperature of the feed except for such materials as may be introduced in the lower portion of section 3 for the purpose of aftertreating the black or for quenching the smoke. Under these conditions the carbon black produced will have a nitrogen surface area of about 35 $m^2$/gm and a dibutylphthalate structure of about 155 cc/100 gm at a photelometer of approximately 90.

In a further embodiment of the invention, the reactor will be so proportioned that the velocity in the lower section will be from about 20 to about 30 feet per second whereas the velocity in the upper smaller section will be from about 2.5 to about 3 times the velocity in the lower, larger section.

The method of the present invention is exemplified by the following example.

A reactor having an upper section having a 24 inch diameter and a second lower section having a 40 inch diameter section was employed. The movable head closing the upstream end of the reactor was adjusted at a distance of 30 inches upstream from the entrance to the lower section. The hydrocarbon feed nozzle was positioned flush with the inner surface of the movable head and the two hot combustion gas nozzles opened tangentially into the upper section through its circumferential periphery about 2 to 3 inches downstream of the oil nozzle. The hydrocarbon feed was an aromatic extract oil conventional in the art for producing carbon black, and had a Bureau of Mines Correlation Index of 117, average molecular weight of 266, and an API gravity at 60°F of 0.4.

Operating conditions were as follows:

| | |
|---|---|
| Hydrocarbon Feed Rate, GPH (30° solid cone spray) | 378 |
| Axial Air Rate, MSCFH | 9.7 |
| Axial Air Temperature, °F | 75 |
| Hydrocarbon Feed Temperature, °F | 430 |
| Tangential Fuel Gas Rate, MSCFH | 8.245 |
| Tangential Air Rate, MSCFH | 124.5 |
| Tangential Air Temperature, °F | 600 |
| Reactor Length (quench), ft. | 24 |
| Total Air to Feed, SCF/Gal. | 355 |
| Tangential Air to Axial Air, Volume Ratio | 12.8 |
| Reactor Pressure, psig | 2 |
| Carbon Black Properties | |
| Photelometer | 86 |
| $N_2$ Surface Area, m²/gm | 35 |
| DBP Structure, cc/100 gm | 156 |

In computing the velocities of the various materials, the volume of the hydrocarbon feed is neglected and the volumes of the air and fuel are considered, for both sections, as being at the actual pressure and at 2500°F, the pyrolytic decomposition temperature of the feed.

Hence, with the area of the 24 inch diameter first section being 3.14 square feet, the velocity therethrough is computed as $$\frac{(9,700 + 8,245 + 124,500)}{3600 \times 3.14} \cdot \frac{(2,960)}{520} \times \frac{14.7}{16.7} = 63 \text{ ft/sec.}$$

With the area of the 40 inch diameter section being 8.78 square feet, the velocity in the 40 inch diameter section is $$63 \times \frac{3.14}{8.78} = 22.5 \text{ ft/sec.}$$

In the above computations, the pyrolytic decomposition temperature of the feed is assumed to be the highest temperature required to decompose the most difficultly-decomposed components of the feed, the discharge nozzle being positioned such that the reactant mass formed in the first zone is substantially at this temperature at the time of entry into the second zone. In the above example, the reactant mass was being heated from about 430° to about 2500°F, both the feed and air being preheated.

The velocity in the first section was about 2.8 times that in the second lower section.

The mixture of hydrocarbon feed, fuel and free oxygen-containing gas, or hot combustion gases of the first zone can be formed in any manner, that is, the streams can be introduced thereinto in any manner. In the preferred embodiment of the invention, the hydrocarbon feed is introduced axially with a quantity of air sufficient to keep the feed nozzle free of carbon deposition. The remainder of the fuel and free oxygen-containing gas is introduced tangentially into the upper zone on an imaginary line traversing the hydrocarbon feed inlet nozzle or just downstream thereof. No further introduction of hydrocarbon feed, fuel, free oxygen-containing gas or hot combustion gases is made except for that quantity of a free oxygen-containing gas which can be introduced into the lower portion of the second section for the purpose of aftertreating the black.

It will be evident from the foregoing that various modifications can be made to the method of this invention. Such are considered, however, to be within the scope of the invention.

What is claimed is:

1. A method of producing a high structure soft carbon black which comprises:
   a. introducing a liquid hydrocarbon feed into a first zone of a tubular reactor;
   b. tangentially introducing hot combustion gases being produced by the oxidation of a gaseous fuel with air employing an air to fuel volume ratio or about 16 to 1 inch into said first zone,
   c. forming a mixture of said liquid hydrocarbon feed and said hot combustion gases in said first zone to bring said hydrocarbon feed to its pyrolytic decomposition temperature, employing an air total to liquid hydrocarbon feed ratio of about 340 to about 360 SCF per gallon,
   d. passing said mixture through said first zone at a first velocity while increasing the temperature of said liquid hydrocarbon feed to its pyrolytic decomposition temperature,
   e. upon attainment of the hydrocarbon feed of its pyrolytic decomposition temperature passing said mixture into a second zone while continuing the pyrolytic decomposition of said liquid hydrocarbon feed,
   f. passing said mixture through said second zone at a second velocity of about 20 to about 30 feet/second to form carbon black, said first velocity being about 2.5 to about 3 times the second velocity, and
   g. recovering said carbon black.

2. The method of claim 1 in which said air to liquid hydrocarbon feed ratio is about 355 SCF per gallon.

* * * * *